Nov. 4, 1947.                    W. W. GARY                    2,430,289
                PROCESS FOR AMMONIATING AN ACID TREATED CLAY
                         Filed Feb. 4, 1944
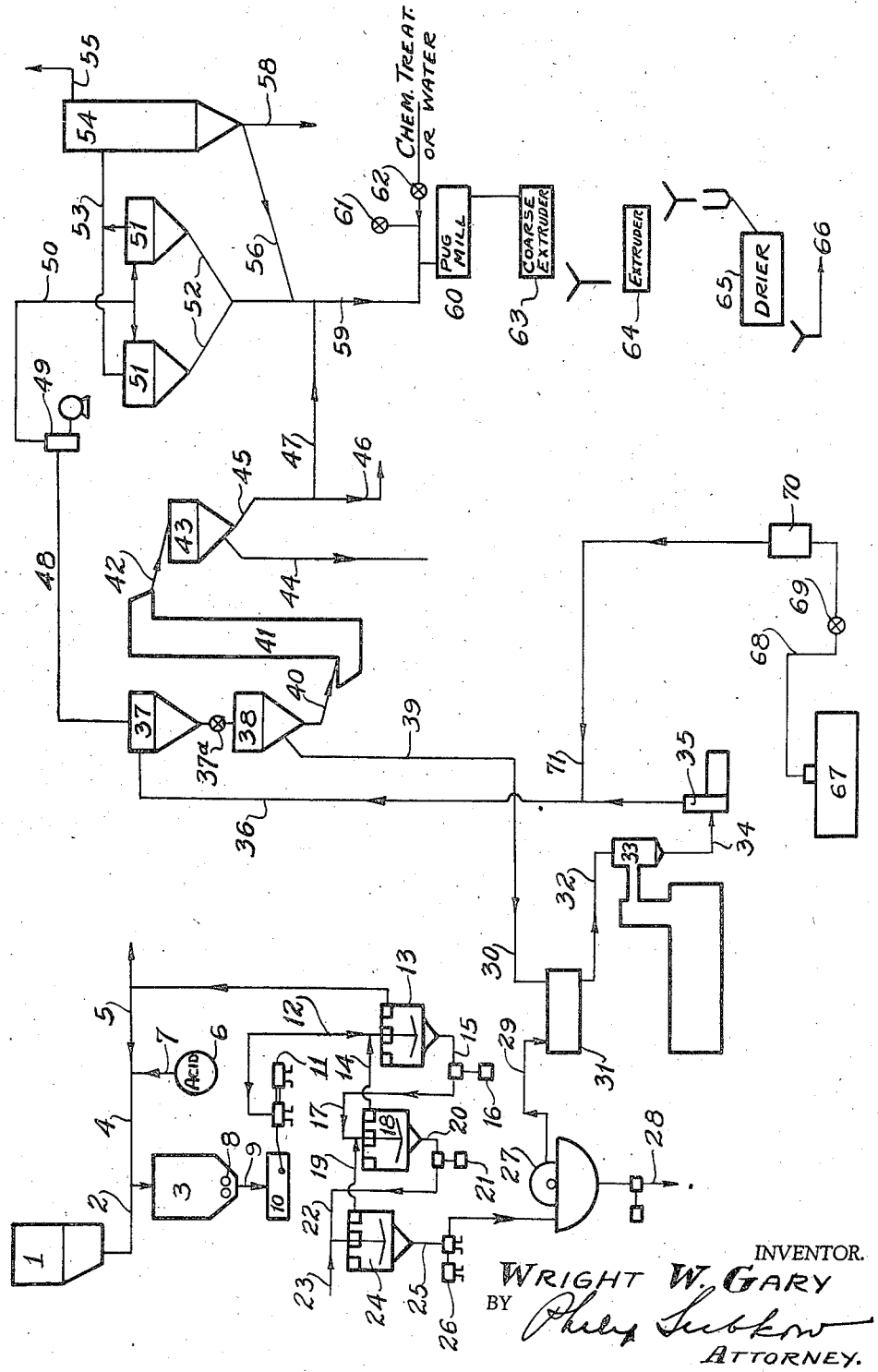
INVENTOR.
WRIGHT W. GARY
BY
        ATTORNEY.

Patented Nov. 4, 1947

2,430,289

UNITED STATES PATENT OFFICE 2,430,289

PROCESS FOR AMMONIATING AN ACID TREATED CLAY

Wright W. Gary, Los Angeles, Calif., assignor to Filtrol Corporation, Los Angeles, Calif., a corporation of Delaware Application February 4, 1944, Serial No. 521,117

12 Claims. (Cl. 252—254)

This process relates to a method of producing active catalytic material of the bentonite clay type. As is well known, bentonitic clays, particularly montmorillonite clays, classifiable as sub-bentonites, may, on acid treatment, be converted into active adsorbents for liquids and gases useful as catalysts. Such catalysts have found a wide application in catalytic cracking of petroleum.

The clay is essentially an alumino silicate, in which part of the alumina is substituted by MgO and in which the hydrogen of the montmorillonite acid is replaced by base exchange with Ca and Mg and other ions. Such clays may also contain iron in the form of silicates or in the form of other compounds such as sulfides or as lattice iron. An analysis of a typical clay is given by the following:

|  | Per cent |
|---|---|
| Silica ($SiO_2$) | 67.3 |
| Alumina ($Al_2O_3$) | 19.5 |
| Iron oxide ($Fe_2O_3$) | 1.8 |
| Magnesium oxide (MgO) | 6.9 |
| Calcium oxide (CaO) | 3.2 |
| Manganese oxide (MnO) | 0.8 |
| Titanium oxide ($TiO_2$) | 0.3 |
|  | 99.8 |

The natural clay is fundamentally montmorillonite, having base exchange capacity of about 124 milliequivalents per 100 grams volatile free substances, this capacity being saturated largely with alkaline earth ions such as calcium and magnesium. Natural clay, therefore, can be defined as a calcium or magnesium montmorillonite.

Upon acid treating the clay, one of the first reactions is the replacement of the calcium and magnesium ions to form a product which is predominately hydrogen montmorillonite. This material may be termed a clay acid in that it shows acidic properties. On relatively light acid treatment calcium and magnesium are not completely removed. As the acid leaching continues alumina and also iron oxide present as impurities are removed. Hydrogen enters into the lattice of the leached clay as the alumina is extracted and there is a loss in base exchange capacity. It is believed, however, that as long as the resulting product is not subjected to rigorous treatment, such as extensive dehydration, the hydrated silica, which is part of the original montmorillonite lattice and which is left as a result of the leaching, is isomorphic with the original montmorillonite; that is to say, the silica and oxygen skeleton of the original montmorillonite is retained. As this extraction continues with reduction of base exchange capacity, as explained, the calcium and magnesium and alumina are more and more completely removed, and a material of lowered base exchange capacity is left.

The degree of removal of $R_2O_3$, namely $Al_2O_3$ and $Fe_2O_3$, is a function of the degree of extraction, that is, it depends on the time, temperature, and concentration of acid employed. The result of this increasing degree of extraction is not merely a difference in degree of improvement in adsorptive and catalytic efficiency, since these properties do not proceed in step with the degree of extraction. Thus, the first of 3% or 4% of $Al_2O_3$ removed gives the largest amplification of adsorptive and catalytic efficiency, and on a further extraction these efficiencies increase further and pass through a maximum, and when the extraction is continued to reduce the $R_2O_3$ content to below about 10% or 12%, the efficiency falls off and the acid extracted clay becomes as inert as the original clay when the $R_2O_3$ content is reduced to about 1% or 3%.

In the acid treatment of the clay, the clay, after coarse grinding, is treated with sulfuric acid of concentration from 5% to 60%, employing from 20 to 150 pounds of anhydrous acid per pound of dry clay (hereinafter termed "dosage"). The time and temperature of extraction is that necessary to give the desired degree of $Al_2O_3$ extraction. The degree of extraction will vary to yield clays varying from 10 to 20% $R_2O_3$.

A typical example of this procedure employs an acid strength of about 12% to 25% and an amount of acid equal to about 30 to 90 pounds of acid per pound of volatile free clay. The temperature employed is about 180° F. to 210° F. The time may be about 3 to 9 hours.

For example, in the case of the clays whose typical analysis is given above, the extraction is continued to give a clay with an $Al_2O_3$ content of from about 16% to about 17%. The time usually is about 6 hours. The clay is washed in Dorr thickeners and the solids are separated from the acid liquor and washed, i. e., by countercurrent decantation cracking. The thickened slurry is then washed, dried, ground and bagged. The clay, after washing, is ground and dried and separated into various mesh sizes. The clay, depending on the degree of washing after acid extraction, will contain residual acidity.

The clay has an acidity resulting from adsorbed sulfuric acid and aluminum sulfate.

Clays produced by the above procedure will contain an amount of acid varying from about 0 to 140 or more milligrams of KOH per gram of clay (i. e., a titratable acidity of 0 to 140), depending upon the amount of washing to which the clay has been exposed.

I have discovered that I may improve the catalytic activity of the clay by ammoniation thereof. I have found that the catalytic activity of the clay may be enhanced by subjecting the clay to the action of ammonia. I have discovered that I may employ ammonia gas for this purpose.

I have also made the unexpected discovery that this ammonia gas combines with the acid treated clay at relatively high temperatures and at low partial pressures to give a large enhancement in catalytic activity. Thus, a moist acid treated clay, particularly if it contains residual acidity obtained by incomplete washing of the clay, may be further activated by passing hot gases at drying temperatures containing a small amount of $NH_3$. The clay is thus dried and activated simultaneously.

While I do not wish to be bound by any theory of the action of the ammonia, I believe that the ammonia is adsorbed by the clay and reacts both with the free sulfuric acid and with the aluminum sulfate, together with the moisture in the clay, to form ammonium sulfate and hydrated alumina, and also that the ammonia is adsorbed by the clay entering between the plates of the montmorillonite crystal structure. Additionally, the ammonia enters into the clay structure by base exchange with the hydrogen of the montmorillonite and thus forms ammonia clay. The resultant clay has a lower titratable acidity, a lower pH, and contains base exchanged ammonia.

I have found that I may add the ammonia to the clay, both at atmospheric and at elevated temperature. For example, I may pass the ammonia or a gas stream containing ammonia through the moist clay at temperatures for drying the clay and at the same time ammoniate the clay. I prefer, however, to limit the temperature during addition to below the range of 900° F. to 1150° F., and preferably below about 350° F. to 400° F. The ammoniated clay is unstable at elevated temperatures and loses $NH_3$ above about 400° F., and the ammonia is completely removed by heating to about 900° F. to 1150° F.

This invention will be further described by reference to the accompanying drawing which illustrates embodiments of my invention by a schematic flow sheet.

The mined clay which has been ground to form an 8 to 12 mesh is contained in bin 1 from which it is fed by a suitable conveyor system, schematically indicated by line 2. It is fed into the acid treating chamber 3 into which has been charged the acid water through line 5 via line 4. Additional acid is passed from container 6 and line 7 into treater 3 to supply the desired quantity of acid for treatment. Steam and air are introduced to agitator 8 and the temperature of the reaction vessel is maintained in this way at the desired level. The acid treated clay is discharged into chamber 10 from which the slurry of clay and residual acid is pumped by pump 11 in line 12 into the decantation washing system. This is schematically shown as three Dorr thickeners, although a larger number may be employed to obtain the desired treatment.

The slurry enters the first thickener 13 where it is mixed with the overflow from thickener 18 passing through line 14. The overflow through line 5 is returned in part for use in treater 3 and part discharged to the sewer or for other utilization. The thickened underflow is pumped to line 15 by pump 16 through line 17 where it enters into thickener 18 commingled with the overflow from thickener 24 passing through line 19. The underflow passing through line 20 is pumped by pump 21 through line 22 where it is mixed with fresh water entering through 23 and is introduced into thickener 24. The underflow from thickener 24 passes through line 25 and is pumped by pump 26 into the filter 27. The filtrate is withdrawn through 28. The filter cake is then washed with water. The degree of washing in the Dorr thickeners and on the filter is sufficient to remove soluble salts and free sulfuric acid. The residual acidity of the clay, consisting of adsorbed aluminum sulfate and free sulfuric acid, may vary in equivalency (KOH per gram of dry clay) from about 1 to 140 or higher, preferably, for the purposes of my invention, from about 5 or 10 to about 60 milligrams of KOH per gram of dry clay.

After washing on filter 27 the acid treated cake, containing around 55 to 65% V. M., is passed through a pug mill 31 where it meets the oversized material passing through line 30, as will be described later, and the commingled material passes through line 32 into the flash drier 33 wherein it is mixed with hot combustion gases generated in the flash drier. The stream of gas carrying clay in suspension is then passed through line 34 into a mill 35, such as a cage mill, and the gases and clay enter the separator system 37 and 38 through line 36. The gases are discharged from cyclone separator 37 through 48 and the solids pass through a rotary valve 37a into a separator 38. Separator 38 may be of the whizzer type in which a rotary fan sets up a centrifugal motion of the clay particles, causing the separation of the desired material into two fractions, a coarser fraction, which is removed via 39 to be passed to the pug mill 31, and a finer fraction which is removed via line 40. This material is elevated by elevator 41 and passed through line 42 into a second whizzer type separator 43. The coarser fraction through line 44 is treated as is described below. The finer material passes through line 45 and may be split, part or all passing through 46 for uses to be further described. Part or all may be passed through line 47, as will be later described. The gas stream separated in 48 is passed by blower 49 into cyclones 51 through line 50. The solids separated in these cyclones are passed through line 52. The gases issuing through line 53 pass to an electrical precipitator 54 and the gases, substantially free of solids, are discharged through 55. The electrical precipitated material may be passed through line 56 to join the material in line 52, or, in part or whole, may be discharged through line 58 for other uses. The material will be thus dried to a V. M. (moisture) of about 15 to 25%.

The material separated via lines 45, 56, or 59 may be passed through the extruder system to be described.

In this extruder system the material which is separated through 52 is introduced into pug mill 60, together with the desired amount of water introduced through line 61 or 62. The amount of water employed is that required for proper extrusion into pellets and usually ranges from 40 to 50%. The material passes from the pug mill 60 into a coarse screw extruder 63 in which the clay passes through large orifices under extrusion pressure of an auger screw, and the extruded material is cut into convenient lengths. It then passes into final extruder 64. The clay pellets are re-pulped and forced through finer orifices of desired dimensions, and cut into desired sized pellets. They then pass through drier 65 to storage through 66.

The pellets may range from $\frac{1}{16}''$ to $\frac{3}{32}''$ in diameter up to the larger sized pellets, depending on their use, and usually are cut off to a length equal to their diameter.

Liquid ammonia ($NH_3$) contained in 67 is passed through line 68 under control of valve 69 through flow meter into line 71 from where it enters line 36 in gaseous form through which the hot gases and clay from the flash drier pass at a temperature of about 250° to 300° F. or 400° F. to the separating system.

The ammonia is added in an amount to give the desired reduction in acidity, i. e., to bring the pH of the clay, when slurried in water, to about 4 to 9 pH, preferably in the range of 5 to 7 pH. For example, the $NH_3$ may be added at the rate of from 30 to 60 pounds per ton of clay. The ammonia concentration in the gases in the flash drier may be in the order of about .5 to 10 mm. of mercury partial pressure.

While I have disclosed a specific form of drier as illustrating the embodiment of my invention, I may employ other types of drier, such as tunnel driers, shaft driers, rotary driers, and may inject the ammonia into the drying gas stream to pass over the clay being dried at temperatures from about 100° to about 300° to 400° F.

The ammonia may also be passed into contact with the clay after it is dried, say, to a V. M. of 15% to 25% or 30%, as, for instance, by introducing the clay into the gas stream in the separator stages where the temperature ranges from 140° F. to about 200° F. Thus, $NH_3$ may be added to the line 48 or 42.

The clay, after separation from the drying gases, for instance, the stream 45, 44, 52, or 56, may also be treated with gaseous ammonia or ammonia diluted with other gases or vapors sent as air or steam or fixed gases by passing the vapors and gases at temperatures below about 900° F. to 1200° F., and preferably at lower temperatures ranging from atmospheric or 100° to 300° or 400 F.

I may pass the gaseous ammonia into the mixture being pelleted, adding this ammonia, for example, into the pug mill 60 through line 62, water being added through 61 to be mixed with the clay containing from about 40 to about 50% moisture. The amount of moisture is sufficient to give a moist extrudable clay, but insufficient to slurry the clay. The ammonia gas is desirably added at ordinary temperatures, or such as may be conveniently attained by release from storage without causing any material evaporation of moisture from the mixture to be pelleted.

In all of the above procedures I pass the gaseous ammonia into contact with the clay containing adsorbed acid, acid salts resulting from incomplete washing of the clay at temperatures to cause a reduction of acidity of the clay and an ammoniation thereof. Preferably, this neutralization reduces the acidity of the clay to about 5 pH and causes the addition of ammonia in base exchange positions ranging from 5 to 80 milliequivalents or more, depending on the degree of acid treatment and residual acidity of the acid treated clay before ammoniation.

In this specification, when I employ the terms "% V. M.," "titratable acidity," "pH," "catalytic activity for cracking," and "density," the values thereof may be determined by the following:

"*% V. M.*"—Five grams of the catalyst are placed into a 20 cc. crucible and ignited in an electric furnace for 30 minutes at a temperature of at least 1800° F. and cooled in a desiccator.

$$\% \text{ volatile matter} = \frac{\text{loss of weight} \times 100}{\text{weight of ignited clay}}$$

"*Titratable acidity.*"—This acidity is determined by the so-called "boil-out" test, in which 5 grams of the clay are boiled with 50 cubic centimeters of distilled water, filtered, and the filter cake washed with 50 cubic centimeters of hot distilled water. The acidity is determined by titration, using phenolphthalein indicator. The acidity expressed in milligrams of KOH per gram of sample is termed "titratable acidity."

"*pH.*"—The clay is dispersed in water in an amount greater than about 20% solids at ordinary room temperature and the pH determined by a pH meter.

"*Catalytic activity.*"—The dried catalyst pellet, such as the pellet formed as described above, is introduced into an oven maintained at 1050° F. and the pellet maintained at this temperature for a period of five hours. The catalyst is then cooled without access to air in a desiccator or similar container, and upon cooling is transferred to air-tight containers. 200 cc. of the catalyst (i. e., sufficient catalyst pellets to occupy 200 cc.) are then transferred into the cracking chamber of the catalyst cracking unit. The catalyst is raised to 800° F. and a vaporized gas-oil (for example, 35.5–37.5 A. P. I. East Texas gas-oil having 700–730° end-point) is passed through the unit at a rate of 30 liters of liquid oil per hour per 20 liters of catalyst. The exiting vapors from the cracking chamber are condensed at a temperature of 60° F. The condensate thus collected is termed the first-cycle condensate. The gases are collected.

At the end of 10 minutes the cracking is discontinued and the catalyst is regenerated by raising its temperature to 900° F. and passing air through the catalyst to convert the deposited carbon into CO and $CO_2$. The passage of air is continued until no substantial amounts of carbon monoxide or carbon dioxide are present in the exiting gases. The exiting gases are then passed to a combustion chamber and any CO is converted to $CO_2$. The total $CO_2$ is determined and the carbon equivalent thereto is determined.

The air flow is then discontinued and the temperature of the catalyst is reduced to 800° F. and a second cycle of 10 minutes is carried out in the manner previously described. Repeated cycles of regeneration and cracking are carried out. The average of several cycles, excluding the first cycle, is taken and is hereinafter reported in the examples given below. The gasoline is reported as volume per cent of feed, gas as weight per cent of feed, and carbon or coke as weight per cent of feed.

The following examples are given as illustrating the results obtainable by my process and are not intended to constitute any limitations thereof:

*Example 1*

Polkville clay, a clay typical of the acid activatable montmorillonite clays, containing about 38% to 40% moisture, having the following analysis was treated in treater 3 with sulfuric acid of about 21% concentration based on the total water content of the mix including the moisture of clay and employing 50% dosage, i. e., 50 pounds of anhydrous $H_2SO_4$ per 100 pounds of clay (calculated as moisture free).

| | Per cent |
|---|---|
| $SiO_2$ | 66.04 |
| $TiO_2$ | 0.36 |
| $Al_2O_3$ | 22.00 |
| $Fe_2O_3$ | 3.06 |
| FeO | ---- |
| MnO | 0.07 |
| MgO | 5.43 |
| CaO | 2.74 |
| $P_2O_5$ | 0.06 |

The treat was carried out at a temperature of about 200° F. to 210° F. for a period of 6 hours. The clay was washed and filtered and dried in the flash drier as previously described. The fraction separated at 59 had a V. M. of 22.6%.

This clay had a titratable acidity of 11.4 milligrams of KOH per gram and a pH of 2.9. It was mixed with water and extruded to form pellets as previously described. The pellets were dried in drier 65 to about 15 V. M.

The catalyst pellet when prepared and used in the above process of catalysts according to the above procedure produced a yield of 29.2% of 410° end-point gasoline, 3.2% gas, and 2.6% carbon was deposited on the catalyst.

The pellet as produced above had a density of 0.820 when tested as above.

*Example 2*

The clay was treated exactly as in Example 1, except that ammonia gas at the rate of 32.5 pounds per ton of finished clay (22.6% V. M.) was added to the stream in line 36 where the temperature was 250–300° F. The clay removed via 59 had a V. M. of 22.6% and a pH of 4.75 to 5.7. On extrusion, in the same manner as the clay of Example 1, the pellet had a density of .716. When prepared and used in the above process of cracking, it produced 410° end-point gasoline with a yield of 34.2%, 4.2% gas, and 2.4% carbon.

*Example 3*

A Cheto clay having the analysis first given was treated with 69% dosage, employing acid of 10% concentration. 22% of the acid was added initially and 78% of the acid was added over a period of 5½ hours to maintain a constant 10% concentration. The material was washed and dried with no ammonia added in the manner previously described. The material discharged from 59 to the extruder had a V. M. of 18%, and titratable acidity of 18 mg. KOH per gram. It had the following analysis:

| | Per cent |
|---|---|
| $SiO_2$ | 84.65 |
| $R_2O_3$ | 8.62 |
| $Fe_2O_3$ | .80 |
| CaO | 2.40 |
| MgO | 2.47 |
| $SO_3$ | 3.97 |

It was pelleted as previously described. The pelleted clay when tested as above had a catalytic activity resulting in a yield of 410° F. end-point gasoline of 27.9%; 3.3% of gas; 2.1% of carbon.

*Example 4*

The same process of activation was followed except that ammonia gas was added in amount sufficient to reduce the acidity of the 18% V. M. clay discharging from 59 to a titratable acidity of 8.7% and a pH of 5. The rate of addition during the run was 40 to 50 pounds of $NH_3$ per ton of dry clay (18% V. M.). The temperature of the drying gases at the point of the ammonia addition was 250° F. to 300° F.

The pelleted clay when prepared and used in the process of catalysis described by the above procedure was as follows: yield of 410° end-point gasoline, 31.7%; carbon, 2.6%; gas, 3.5%.

*Example 5*

The clay of Example 4 was treated with a dosage 57% acid at 10% concentration. 29% was added initially and the remaining 71% was added over a period of 6 hours to maintain the concentration of the acid constant at 10% throughout the treat. The clay was washed and dried to produce a clay discharging from 59 having a V. M. of 22.3% with titratable acidity of 40.5 mg. KOH per gram of clay. This clay had the following analysis:

| | Per cent |
|---|---|
| $SiO_2$ | 81.04 |
| $R_2O_3$ | 12.44 |
| $Fe_2O_3$ | 1.4 |
| CaO | 4.0 |
| MgO | 3.22 |
| $SO_3$ | 8.63 |

The clay was pelleted, prepared, and used as previously described and gave the following results: 410° F. end-point gasoline, 31.5%; gas, 3.8%; carbon, 3.1%.

*Example 6*

The same clay was treated in the manner of Example 5 except that gaseous ammonia was added as previously described in an amount to give a clay discharging from 59 having a V. M. of 23.8% which when suspended in water had a pH of 5 and a titratable acidity of 9.9 mg. of KOH per gram of clay. The rate of ammonia addition ranged from 40 to 50 pounds per ton of finished clay. The clay was pelleted as described above and when tested as described previously gave the following results: 410° F. end-point gasoline, 34.8%; gas, 4.5%; carbon, 3.2%.

While I have described a particular embodiment of my invention for the purpose of illustration, it should be understood that various modifications and adaptations thereof may be made within the spirit of the invention as set forth in the appended claims.

I claim:

1. A process for the production of a catalyst, which comprises acid treating an acid activatable clay to extract alumina therefrom, separating the clay from the acid to produce a clay containing a titratable acidity of about 140 mg. of KOH per gram of clay or less, and contacting said clay with gaseous ammonia at a temperature sufficiently high to dry the clay but not sufficiently high to drive off the ammonia to bring the clay to a lower titratable acidity and to produce a clay of pH of about 4 to about 9.

2. A process for the production of a catalyst, which comprises acid treating an acid activatable clay to extract alumina therefrom, separating the clay from the acid to produce a clay containing a titratable acidity of about 140 mg. of KOH per gram of clay or less, and contacting said clay with a stream of gas containing a minor proportion of gaseous ammonia at a temperature sufficiently high to dry the clay but not sufficiently high to drive off the ammonia to dry said clay and to bring the clay to a pH of about 4 to about 9.

3. A process for the production of an acid clay catalyst, which comprises reacting an acid activatable clay with acid solution to convert the same into activated acid clay, washing said clay to remove residual acid, separating the moist clay from said wash water to produce an activated acid clay containing appreciable titratable acidity and a moisture content of about 65% or less, passing a stream of gas containing ammonia in contact with said clay at an elevated temperature of about 250–450° F., simultaneously reacting said clay with said ammonia and drying said clay, and separating an ammoniated clay containing a moisture content appreciably lower than the moisture content of said moist acid clay.

4. A process for the production of a catalyst, which comprises reacting an acid activatable clay in an acid solution to convert said clay into an activated acid clay, separating said clay from the residual acid solution to produce a moist clay containing titratable acidity of about 5 to 60 milligrams KOH per gram of clay and a moisture content of about 65% or less, contacting said clay at an elevated temperature above about 200° F. with a gaseous stream containing ammonia in an amount sufficient to reduce the titratable acidity of said clay to bring the pH of said clay, when slurried with water, to about 4 to 9, to reduce the moisture content of said clay to about 25% or less, and separating said dried and ammoniated clay.

5. A process for the production of a catalyst, which comprises reacting an acid activatable clay in an acid solution to convert said clay into an activated acid clay, separating said clay from the residual acid solution to produce a moist clay containing appreciable titratable acidity of less than about 140 milligrams KOH per gram of clay and a moisture content of about 65% or less, contacting said clay at a temperature sufficiently high to dry the clay but not sufficiently high to drive off the ammonia with a gaseous stream containing ammonia in an amount sufficient to reduce the titratable acidity of said clay to bring the pH of said clay, when slurried with water, to about 4 to 9, and separating dried and ammoniated clay containing a moisture content of about 25% or less.

6. A process for the production of catalyst, which comprises acid activating an acid activatable clay, with an acid capable of reacting with said clay to activate said clay, separating the acid from the moist acid clay, and passing a drying gas containing gaseous ammonia into contact with said moist acid clay at drying temperature to dry said clay and to reduce the acidity of said clay.

7. A process for the production of catalyst, which comprises acid activating an acid activatable clay, with an acid capable of reacting with said clay to activate said clay, separating the acid from the moist acid clay, and contacting said moist acid clay with a stream of drying gas containing a minor proportion of ammonia at drying temperature to dry said clay and to reduce the residual acidity of said clay.

8. A process for the production of a catalyst, which comprises acid actuating an acid activatable clay to extract alumina therefrom, separating moist clay from the acid to produce a clay containing an appreciable titratable acidity of 140 mg. of KOH per gram of clay or less, and drying said clay with a drying gas containing gaseous ammonia in the absence of added water to dry said clay and to reduce said titratable acidity and to bring said clay to a pH of about 4 to about 9.

9. A process for the production of a catalyst, which comprises acid activating an acid activatable clay to extract alumina therefrom, separating the clay from the acid to produce a clay containing a titratable acidity of about 140 mg. of KOH per gram of clay or less, and drying said clay with a drying gas containing gaseous ammonia at a temperature of about 100° F. to about 400° F. to reduce the titratable acidity of said clay and to bring the clay to a pH of about 4 to about 9.

10. A process for the production of a catalyst, which comprises reacting an acid activatable clay with an acid solution, converting said clay into an activated acid clay, separating the acid clay from the residual acid solution, producing a moist clay containing appreciable titratable acidity and a V. M. content of about 65% or less, drying said clay with a drying gas stream containing ammonia, to dry said clay and to react said ammonia with said clay, and separating an ammoniated clay.

11. A process for the production of an ammoniated acid activated clay catalyst, which comprises reacting an acid activatable clay with an acid solution to convert said clay into activated acid clay, washing said clay to remove residual acid from said clay, producing an acid clay containing appreciable titratable acidity and containing 65% or less of volatile matter, drying said clay with a gas stream containing ammonia in contact with said moist clay, reacting said ammonia with said clay, and separating ammoniated clay.

12. A process for the production of a catalyst, which comprises reacting an acid activatable clay in an acid solution to convert said clay into an activated acid clay, separating said clay from the residual acid solution to produce a moist clay containing titratable acidity of about 5 to 60 milligrams KOH per gram of clay and a moisture content of about 65% or less, contacting said clay with a gaseous stream of drying gas containing ammonia in an amount sufficient to reduce the titratable acidity of said clay to bring the pH of said clay, when slurried with water, to about 4 to 9, and separating said clay, and thereby drying said clay and reacting it with ammonia.

WRIGHT W. GARY.

REFERENCES CITED

The following references are of record in the file of this patent:

UNITED STATES PATENTS

| Number | Name | Date |
|---|---|---|
| 2,066,212 | McKellar | Dec. 29, 1936 |
| 1,800,687 | Henderson et al. | Apr. 14, 1931 |
| 1,991,819 | Nutting | Feb. 19, 1935 |
| 1,598,255 | Prutzman et al. | Aug. 31, 1926 |
| 2,283,174 | Bates | May 19, 1942 |
| 2,242,553 | Thomas et al. | May 20, 1941 |
| 1,705,482 | Keyes | May 19, 1929 |
| 2,315,410 | Fitz Simons et al. | Mar. 30, 1943 |
| 2,229,353 | Thomas et al. | Jan. 21, 1941 |
| 2,403,753 | Pierce et al. | July 9, 1946 |